United States Patent Office 3,299,349
Patented Jan. 17, 1967

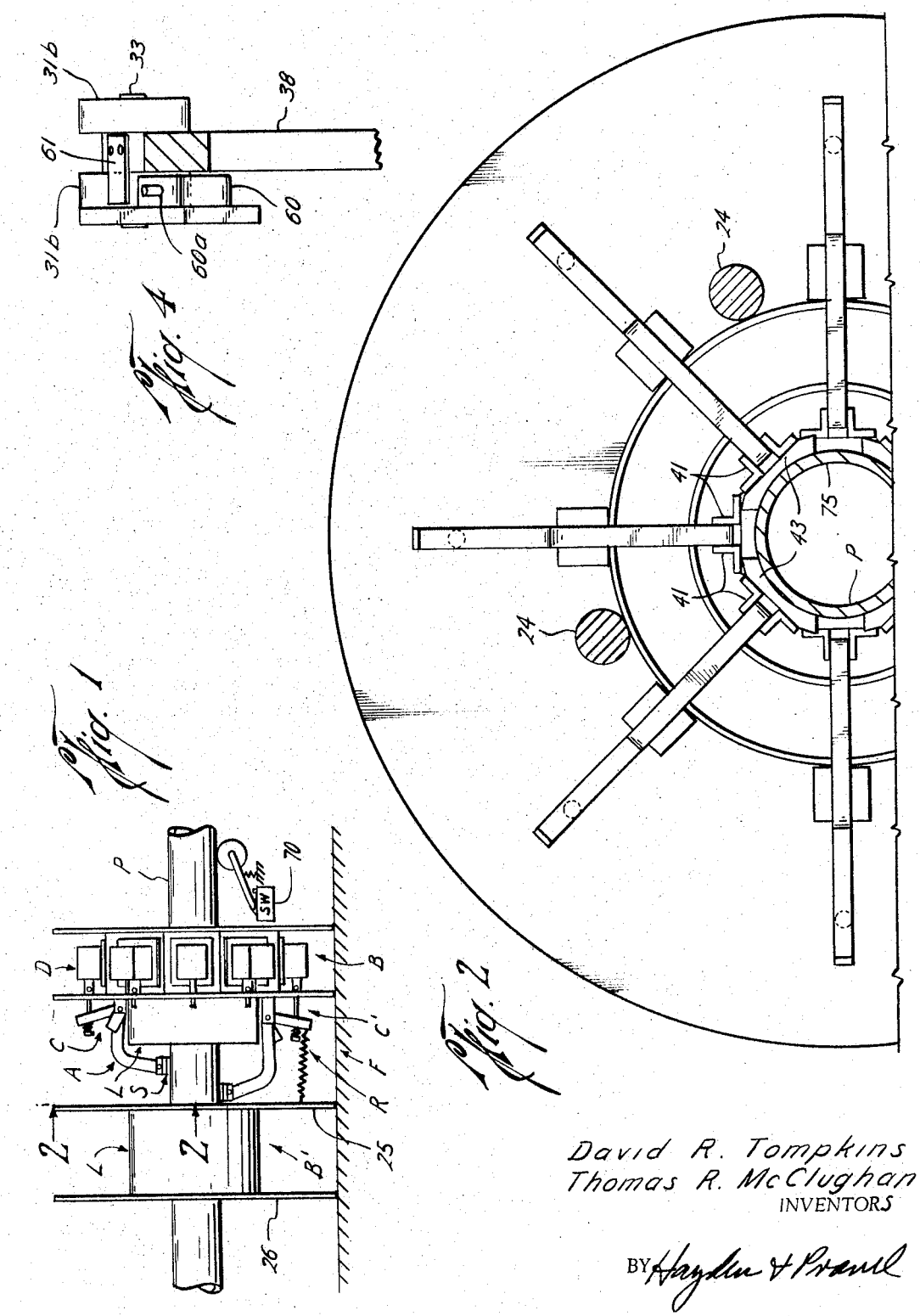

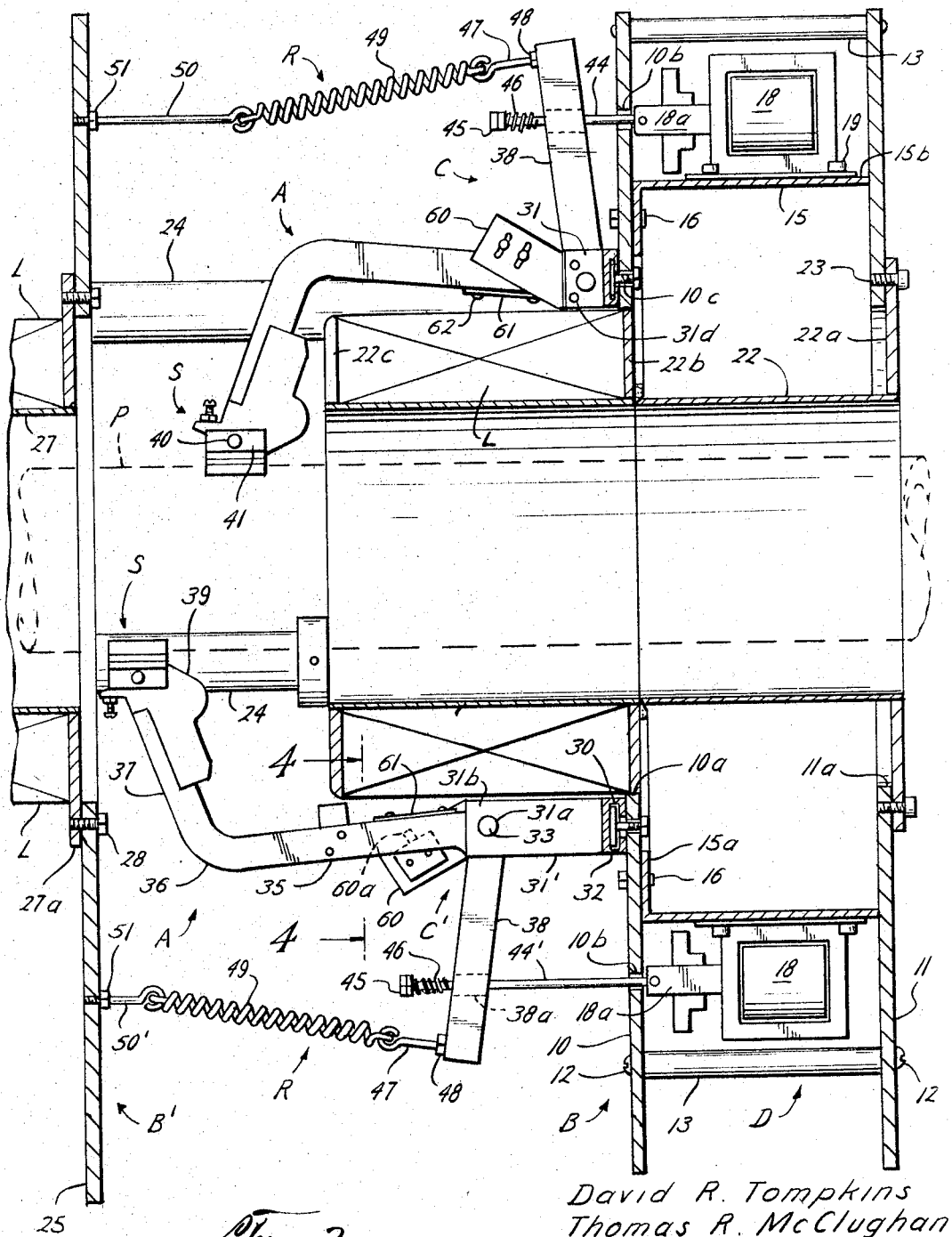

3,299,349
MAGNETIC PIPE INSPECTION DEVICE WITH PIVOTALLY MOUNTED SENSOR MEANS
David R. Tompkins and Thomas R. McClughan, Houston, Tex., assignors to Plastic Applicators, Inc., a corporation of Texas
Filed Feb. 28, 1964, Ser. No. 348,047
2 Claims. (Cl. 324—37)

This invention relates to magnetic pipe inspection apparatus which longitudinally magnetizes an elongate object and positions a plurality of inspection sensors in contact with the outer surface of the elongate object in a circumferential arrangement to detect magnetic field variations caused by flaws, voids, and other structural anomalies in the object, and more particularly, the invention enbales the elongate object to be inspected without requiring the object to be initially centralized with respect to the equipment of the present invention which suspends the inspection sensors so that crooks, bends, flanges, upset, and other such irregularities in the structure of the elongate object do not interfere with the inspection.

Magnetic pipe inspection equipment presently used induces magnetic lines of flux in tubular members which extend from the outer surface of the member being inspected at many various and uncontrolled angles. Inspection of tubular members depends on the rate at which an inspection sensor intersects magnetic lines of flux when passed adjacent the outer surface of the member undergoing inspection. Devices presently used have been less than successful in detecting magnetic field variations indicative of flaws and other structural anomalies and at the same time avoiding detection of magnetic lines of flux which extend from the surface of the member at random angles. Prior art devices have been additionally handicapped by critical spacing or positioning requirements for the plurality of inspection sensors which are alternately staggered about the circumference of a tubular member in various circumferential arrangements. Further, devices presently used are limited to inspection of new or undamaged straight elongate objects having little or no variation in diameter along the length thereof. This limitation is extreme in view of the fact that oil and gas well drilling operations often permit reuse of drill pipe which is quite often bent or twisted resulting from earlier usage. Thus, it may be seen that the inspection equipment currently in use is severely limited to inspection of new or straight pipe having none of the above mentioned deviations, which fact limits the applicability and usefulness of inspection systems now known.

This invention provides a magnetic pipe inspection device which magnetizes a longitudinal portion of an elongate object and positions a plurality of inspection sensors mounted on radially extending arms against the outer surface of the magnetized portion of the member to uniformly inspect the member for magnetic field variations indicative of flaws, voids, seams, and other structural anomalies. Such apparatus supplies signals to the signal recording and indicating circuitry which do not vary in amplitude resulting from movement of a particular inspection sensor from a critical position. Additionally, the plurality of inspection sensors are positioned to provide maximum signals so that the recorded signals are representative of the full range of magnetic field variations existing immediately adjacent the outer surface of the inspected item. Further, the apparatus enables a comparison to be made between two signals derived from different portions of a given specimen during inspection or from different items inspected at different times due to the fact that variations in sensitivity are not introduced. Further, the magnetic pipe inspection device of this invention enables the inspection sensors carried thereby to provide full circumferential inspection about the outer surface of the elongate member in spite of variations in diameter of the member and variations in the straightness thereof and without requiring initial centralization of the member relative to the inspection apparatus.

An object of this invention is to provide a new and improved magnetic pipe inspection device which magnetizes a substantial portion of an elongate member to prevent magnetic lines of flux from extending from the surface at many random angles and confusion of said magnetic lines of flux with magnetic field variations indicative of flaws, voids, and other structural anomalies.

An important object of this invention is to provide a new and improved magnetic pipe inspection device which utilizes a plurality of inspection sensor mounting shoes positioned circumferentially about elongate members to be inspected in which the positioning of the shoes relative to one another and relative to the apparatus is not critical.

Still another important object of this invention is to provide a new and improved magnetic pipe inspection device which inspects elongate members without initially requiring the member being inspected to be centralized relative to the apparatus.

Still another object of this invention is to provide a new and improved magnetic pipe inspection device which inspects crooked or bent elongate objects.

A further object of this invention is to provide a new and improved magnetic pipe inspection apparatus which yields full, circumferential inspection of an elongate member with a plurality of sensor means which are urged radially of the device to contact the surface of the elongate member wherein the means contacting the inspection sensors with the elongate object aligns the plurality of inspection sensors with one another to avoid gaps therebetween and resulting intermittent inspection.

Yet another object of this invention is to provide a new and improved magnetic pipe inspection device which inspects elongate objects having flanges, upsets, lips, noncircular cross actions, crooks, bends, and other such irregularities.

An important object of this invention is to provide a new and improved magnetic inspection device having a pair of spaced apart, circular coils which form an axial magnetic field therebetween and having a plurality of circumferentially positioned sensor shoes between the two coils.

Still a further object of this invention is to provide a new and improved magnetic pipe inspection device which protects the sensor shoes from damage caused by pipe flanges and other such projections by lifting the shoes over the projections.

Other and further objects of the invention will be readily apparent when the following description is considered in connection with the accompanying drawings wherein:

FIG. 1 is an elevational view of the inspection apparatus of this invention illustrating the apparatus of this invention used to position inspection sensors relative to a pipe, the magnetic coils, and the relationship of the pipe to the inspection equipment of this invention;

FIG. 2 is a sectional view taken along the line 2—2 of FIG. 1;

FIG. 3 is a sectional view taken along a diameter of the magnetic inspection apparatus of this invention illustrating the inspection sensor suspension system; and FIG. 4 is a sectional view taken along the line 4—4 of FIG. 3.

In the drawings, the letter F generally designates the frame of the apparatus and the frame is comprised of a base B and a parallel, longitudinally disposed base B'. Each of the bases B and B' supports a coil L and in addition, the base B is utilized for connecting a plurality of flexible connectors C and C′ to the frame F. Each flexible connector is connected to a mounting arm A which extends toward the outer surface of the pipe P as the pipe P is moved longitudinally of the inspection equipment and has an inspection sensor mounting means S urged into contact with the pipe P. The inspection sensor mounting assemblies S are maintained in contact with the outer surface of the pipe P by the resilient means designated generally at R and they are also lifted from the outer surface of the pipe P by operation of the electrodynamic means mounted on the base B and identified generally at D. Thus, the mounting shoe assemblies S follow the outer surface of the pipe P when the pipe P is moved toward the apparatus and the dynamic means D is operated to lift the inspection sensor mounting assemblies S from the outer surface of the pipe P if the operator decides to move the pipe P in the reverse direction.

Considering the invention more in detail, the base B includes a pair of parallel, circular plates 10 and 11 which are secured together in a spaced relationship by a plurality of bolts 12 which are threadedly engaged with spacer rods 13 which extend between appropriately located holes in the plates. The plate 10 has a central opening defined at the edge 10a and the plate 11 also has a central opening defined at the edge 11a. A cylindrical plate 15 is placed between the plates 10 and 11 and is attached to the plate 10 by means such as bolts 16 which are engaged with a radially extending flange 15a abutting against the base plate 10. The plate 15 divides the space between the plates 10 and 11 into an inner, circular volume which is particularly adapted to receive and hold wires, cables, and other electrical lines (which have been deleted for clarity) while the outer surface 15b of the plate 15 defines the volume which is particularly adapted for receiving the dynamic means D therein. Each solenoid 18 is mounted on the outer surface 15b of the plate 15 by means such as the bolts 19 in a position so that the armature 18a of the solenoid 18 is positioned adjacent an opening 10b in the plate 10.

The base B is generally assembled around a tubular sleeve 22 which is inserted in the openings 10a and 11a of the plates 10 and 11 and which is attached to the plate 11 by any suitable means such as the bolts 23 which are threadedly engaged with a flange 22a of the sleeve 22. The sleeve 22 includes two additional flanges, 22b and 22c, which are particularly adapted to receive the windings of the coil L therebetween to locate the coil L relative to the inspection sensors. The base B is connected to the base B′ by the longitudinally extending members 24 which are attached to the bases B and B′ by any suitable means. The base B′ includes the circular plates 25 and 26 which are secured to the sleeve 27 which has a flange 27a abutting the plate 25. The flange 27a is connected to the plate 25 by any suitable means such as the bolts 28 to position the sleeve 27 so that the pipe P may pass therethrough. The coil L is wound about the flanged sleeve 27 and is preferably identical to the coil L associated with the base B.

A plurality of circumferentially positioned holes in the plate 10 are adapted to rotatably engage the shafts of a plurality of bolts 30. Each connector C and C′ includes a plate assembly 32 which is rotatably attached to the bolt 30 and the plate assembly 32 is connected to a longitudinally extending clevis 31. Considering the connector C′, the clevis assembly 31′ is attached to the plate 32 in a longitudinal arrangement abutting thereagainst by means such as tap screws or the like. The end plate 32 has a central opening which is counterbored in the abutting face to provide access for the head of the bolt 30 to permit the bolt 30 to rotate freely relative to the plate 32. Thus, the upper arm 37, lower arm 35, and lever arm 38 may pivot about a fixed axis which is parallel to and spaced from the line of travel of the pipe P as it moves through bases B and B′ as shown in FIG. 3. The clevis 31′ has a pair of extending flanges 31b at one end of the assembly and each flange has an opening 31a which is particularly adapted to receive a pivot pin 33 therein. Thus, the upper arm 37, lower arm 35, and lever arm 38 pivot about a fixed axis which is perpendicular to and spaced from the line of travel of pipe P as it moves through bases B and B′ as shown in FIG. 3. The connector C is identical in all respects to the connector C′ except for the fact that the clevis 31 of the connector C is shorter in length than the clevis assembly 31′. One flange of each of the clevis assemblies 31 and 31′ is drilled with a pair of holes 31d usable as mounting holes as will be further described hereinafter.

Each connector C and C′ permits movement of the attached mounting arm assemblies A which are pivotally connected at the pin 33 so that the attached sensor shoe mounting assemblies S are positioned adjacent the outer surface of the pipe P. Considering the mounting arm assembly A connected to the connector C′, the assembly A includes a lower arm 35 which is connected to an upper arm 37 at an elbow 36. A lever arm 38 is adjoined to the lower arm 35 and extends from the clevis 31′ radially outwardly of the base plate 10 to a position spaced from and directly in line with the hole 10b of the plate 10. The upper arm 37 has a canted surface 39 which extends toward the mounting shoe assembly S from a point above the elbow 36. The sensor shoe assembly S is pivotally connected to the mounting arm A by a pin 40 which extends through a pair of flanges 41 of the mounting shoe assembly S and through the lower end of the arm 37. Thus, as can be seen from FIG. 3 of the drawings, the member 43 which supports the inspection sensor pivots about a fixed axis perpendicular to and spaced from the line of travel of the pipe P through the bases B and B′. The flanges 41 are attached to an arcuately curved backing member 43 having a face adapted for mounting an inspection sensor as close to the pipe P as possible. Since the inspection sensors are common coils or windings having very little thickness, they have been deleted from the drawings because the drawings would only reveal an edge view which would not materially increase an understanding thereof.

The lever arm 38 which is positioned adjacent the opening 10b in the plate 10 has a hole 38a which extends therethrough and is adapted to receive the shaft of a push rod 44′ therein, said push rod being pivotally connected to the armature 18a of the solenoid 18. The outer end of the push rod 44′ terminates at a nut 45 which is fixedly engaged therewith and a buffer spring 46 is placed on the shaft of the push rod 44′ to cushion engagement of the lever arm 38 with the nut 45. The movable end of the lever arm 38 has an opening therein which is utilized to receive the shank of a short eyebolt 47 which is locked thereto by means such as the lock nut 48 to prevent movement relative thereto. The eyebolt 47 secures one end of the spring 49 to the mounting arm assembly A and the opposite end of the spring 49 is engaged with the eye of a similar eyebolt 50′ which is threadedly engaged with the plate 25 and locked thereto by means such as the nut 51. The spring 49 which is connected to the lever arm 38 torques the mounting arm assembly A about the pivot pin 33 to urge the sensor shoe mounting assembly S toward the surface of the pipe P so that the inspection sensors may inspect the structure of the pipe P when the pipe P is magnetized.

The resilient means R pictured at the top of FIG. 3 are identical to the resilient means shown at the bottom of the figure except that the lengths of the push rod 44 and eyebolt 50 are varied to compensate for variation in location of the lever arms 38. The push rod 44 is preferably shorter than the push rod 44′ due to the fact that the connector C utilizes the clevis assembly 31 which is materially shorter than the clevis assembly 31′. The shorter push rod 44 preferably has an identical nut 45 on the outer end thereof and preferably has an identical buffer spring 46 positioned about the shaft thereof which likewise cushions contact between the lever arm 38 and the nut 45. The eyebolt 47 is illustrated as having the same length as the eyebolt 47 shown at the bottom of the figure and it is likewise locked to or secured against the lever arm 38 by the lock nut 48. The resilient spring 49 is engaged with the eye of the eyebolt 50 which is somewhat longer than the eyebolt 50' and is locked to the plate 25 by the lock nut 51. Since each lever arm 38 is identical whether used with either connector C or C', and the resilient means R utilize springs 49 which are preferably equal in strength, it may be appreciated that the torque asserted by each resilient means R on the mounting arm assemblies A is identical regardless of the variation in lengths of the flexible connectors C and C'.

Each flexible connector C and C' includes the aforementioned mounting holes 31d which are drilled in the flange 31b which are preferably used to position and locate a microswitch 60 adjacent the lower arm 35 of the mounting arm assemblies A. The microswitch 60 is mounted at an angle extending above the lower arm 35 and has a microswitch contact 60a extending therefrom on the side parallel to and adjacent to the lower arm 35. The lower arm 35 carries a striker plate 61 which is attached by a pair of tap screws indicated at 62 and which extends from beneath the mounting arm assembly A to a position in line with the contact 60a of the microswitch 60. FIG. 4 illustrates the position of the microswitch 60 relative to the plate 61 which extends from the mounting arm assembly A to strike or contact the contact 60a as an indication of rotation of the mounting arm assembly A. Each of the microswitches 60 is preferably wired in series so that an electrical signal is formed which indicates that all the mounting arm assemblies A are lifted from the surface of the pipe P.

In operation of the inspection equipment of this invention, the pipe P or other elongate object is moved longitudinally through the openings in the bases B and B' as shown in FIG. 1. Current is supplied to the coils L to form a magnetic field between the bases B and B', it being assumed that the coils L are wound to form reinforcing magnetic fields. As the pipe P is urged through the base B and towards the base B', the mounting arm assemblies A position the sensor shoe assemblies S in contact with the outer surface of the pipe P. The pipe P is thereafter translated through the opening in the base B' so that both coils may utilize the ferromagnetic structure of the pipe P as a magnetic core for concentrating the lines of magnetic flux which are created therebetween in a substantial longitudinal portion of the pipe P. The relative permeability of the pipe P is such that the lines of magnetic flux extending between the two coils L are concentrated in the wall structure of the pipe P without centralizing the pipe P relative to the coils and withou regard to other structural or positional variations of the pipe P relative to the inspection equipment of this invention. The longitudinal flux concentrated in the wall of the pipe P is accompanied by a relatively weak magnetic field exterior of the outer surface of the Pipe P through which the sensor shoe assemblies S are passed. The lines of flux formed in the wall structure of the pipe P extend longitudinally thereof without variation as long as the wall structure is relatively uniform, but structural anomalies alter the permeability at a point which alteration produces variations in the magnetic flux pattern. The variations of flux intensity may be detected beyond the surface of the pipe P by an inspection sensor which is passed through the variations near the outer surface of the pipe P. It is to be noted that the intensity of the variations decreases rapidly as the distance from the flaw or structural anomaly increases. Therefore, sensitive detection is inherently related to and is dependent on positioning the inspection sensors as close as possible to the outer surface of the pipe P. This is accomplished by the mounting arm assemblies A which are connected to the flexible connectors C and C' as is set forth hereinbefore.

The inspection equipment of this invetnion is adapted to be used with pipe loading and handling equipment in which the pipe P is steadily moved toward inspection apparatus of this invetnion from the right as viewed in FIG. 1. The magnetic pipe inspection apparatus is preferably switched from the standby state when the pipe P contacts the switch 70 immediately before entering the base B. The switch 70 is preferably wired to energize the magnetizing coils L and to lower the sensor shoe assemblies S to enable the inspection sensors to pass over the outer surface of the pipe P. The inspection sensors and associated sensor shoe assemblies S are preferably elevated or lifted from the surface of the pipe P when the equipment is not in use and also when the pipe P is moved in the reverse direction longitudinally of the frame F.

It may, on occasion, be necessary to move the pipe P in the reverse direction relative to the inspection equipment of this invention on which occasion the sensor shoe assemblies S are lifted from the surface of the pipe P to avoid duplicate inspection of the pipe P. The pipe loading and handling equipment (not shown) is reversed to move the pipe P in the reverse direction upon the formation of an electrical signal indicating that all the mounting arm assemblies A are lifted from the surface of the pipe P. The mounting arm assemblies A are lifted by applying electrical power to the electrodynamic means D so that the solenoids 18 are actuated to move their armatures 18a and the attached push rods 44 and 44'. The push rods rotate the lever arms 38 and also rotate the rigidly attached mounting arm assemblies A to lift the sensor shoe assemblies S from the surface of the pipe P. When each mounting arm assembly A is lifted by its attached solenoid 18, the striker plate 61 is rotated about the pivot pin 33 to strike or contact the contact 60a of the microswitch 60 to form an electrical signal indicating that the mounting arm assembly A is elevated. When each mounting arm assembly A is lifted and subsequently strikes the adjacent contact 60a of the microswitch 60, the plurality of microswitches 60 which are wired in series will indicate that all sensor shoe assemblies S are elevated above the surface of the pipe P so that the pipe P may thereafter be moved in the reverse direction. If desired, the microswitches 60 may be wired in series with the electrical power applied to the pipe handling equipment used to move the pipe P in the reverse direction so that the power is not applied to the pipe handling equipment on reverse operation except as a result of the operation of the microswitches 60.

The apparatus of this invention is particularly adapted to inspect elongate objects having irregularities such as crooks, bends, flanges, upsets, and other such variations. If, for instance, the pipe P is crooked, the inspection equipment of this invention inspects the pipe P regardless of the crookedness in the pipe. FIG. 2 illustrates the relationship of the pipe and the magnetizing coils L which form the magnetic flux which extends between the magnetizing coils and is concentrated in the structure of the pipe P as long as the pipe P is placed or positioned in the openings of the magnetizing coils. The inspection sensors are contacted against the outer surface of the pipe P as illustrated in FIG. 2 and they further encompass the surface of the pipe P even when the pipe P deviates from the centralized position of FIG. 2. If the crookedness of the pipe P causes the portion of the pipe P contacted by the sensor shoe assemblies S to deviate from the central position, each mounting arm assembly A operates independently to maintain contact with the pipe P. Each mounting arm assembly A is adapted to rotate about the pivot pin 33 to move the attached sensor shoe assembly S radially of the inspection equipment to follow the surface of the pipe P. At the same time, the connector C or C' may rotate about the shaft of the bolt 30 to contact the sensor shoe assembly S against the surface of the pipe P if the pipe should be positioned laterally with respect to the particular mounting arm assembly A attached to the rotated connector.

The curved inner faces of the backing assemblies 43 maintain contact with the outer surface of the pipe P and, since the mounting arm assemblies are perpendicular thereto, the backing assemblies 43 maintain the mounting arm assemblies A perpendicular to the surface of the pipe P wherever located in the equipment which fact accounts for the propensity of the equipment to maintain full circumferential inspection. FIG. 2 discloses that the inspection sensor mounting assemblies S positioned in two rows tend to overlap so that portions of the pipe P are inspected twice as the pipe P traverses the inspection equipment. It is desirable to have the inspection sensors of the two rows overlap because the sensitivity of any one inspection sensor decreases as a particular flaw passes progressively further from the center point thereof Thus, if a particular flaw is located at some position such as that exemplified at the point 75 on the pipe P, that flaw will be inspected by two inspection sensors which fact will materially decrease the possibility that a flaw will pass through the equipment without being sensed.

The apparatus is additionally capable of inspecting pipe or other tubular members having protrusions such as flanges on the other surface without requiring any alteration of the equipment. Assuming that the pipe P has a flange or other abrupt variation in diameter, the inspection apparatus rides over the protrusion and returns to the position illustrated in FIG. 2. The flange or protrusion will contact the inspection shoe sensor assemblies S as the pipe P moves through the equipment and will tend to carry the sensor shoe assemblies S longitudinally thereof. Such motion of the sensor shoe assemblies will rotate the mounting arm assemblies A about the pivot pins 33 and will tension the springs 49 of the resilient means R. The sensor shoe assemblies will move radially outwardly of the pipe P until the flange passes therebeneath and the resilient means R will thereafter urge the mounting arm assemblies A radially inwardly toward the pipe P to contact the sensor shoes S agains the outer surface. If the projection or other surface irregularity does not fully circumscribe the pipe P, each inspection arm assembly reacts independently of the other inspection arm assemblies so that those sensor shoe assemblies S unaffected by the structural irregularity will independently maintain contact with the outer surface of the pipe P. On the other hand, those which are affected by the structural irregularity will ride over the irregularity and return to the illustrated position of FIG. 2 when the surface of the pipe P resembles that shown in FIG. 2.

Certain alterations may be incorporated with the invention without departing therefrom. For instance, additional coils and/or windings may be provided in the magnetizing portion of the apparatus to further control the shape of the magnetic field. Also, the inspection sensors may be positioned in any circumferential pattern about the pipe P as desired and may be arranged in three or perhaps ever four circumferential rows if desired. The dynamic means D and the attached push rods may be varied in form to include electric motors and rack and pinion drives as a means of operating the inspection assemblies and for lifting them from the surface of the pipe P. Various constructions of pivotal means such as the universal joint may be incorporated in the mounting arm assemblies for the flexible connectors C and C' and the sensor shoe assemblies S may be connected to the mounting arm assemblies A by means such as ball and socket joints. The suspension apparatus associated with the inspection sensors is preferably longitudinally displaced of the point of contact on the surface of the pipe P by the elbow 36 to permit visual inspection of the operation of the equipment, but the suspension system could extend radially outwardly of the pipe P without any substantial bends or elbows so that the flexible connectors would be radially in line with the attached sensor shoe assembly S.

Briefly, this invention relates to a new and improved apparatus which is particularly designed to longitudinally magnetize an object and to additionally inspect the elongate object for flaws as evidenced by small variations in the magnetic field immediately adjacent the outer surface of the object. The apparatus is particularly capable of inspecting objects having flanges, upsets, crooks, bends and other such deviations.

What is claimed is:
1. Apparatus for inspecting elongate members moving longitudinally through the apparatus comprising:
 (a) a frame;
 (b) said frame including a pair of parallel, longitudinally spaced bases;
 (c) means connected between said bases to maintain them fixed in spaced relation;
 (d) each of said bases including a pair of plate members having central openings therethrough;
 (e) coil means carried by each of said bases;
 (f) said coil means having support means including sleeves extending longitudinally adjacent the central opening formed in said plate members;
 (g) said coil means forming an aiding longitudinal magnetic field therebetween in the elongate members;
 (h) means pivotally mounted on one of said bases forming at least a pair of pivotal mounting axes parallel to the path of the elongate members;
 (i) an extended arm pivotally mounted between its ends on each of said last named means for pivoting each of said arms about an axis that is perpendicular to the path of the elongate members;
 (j) sensor mounting means carried near one end of each of said arms, said sensor mounting means being pivotally connected thereto forming another axis which is perpendicular to the path of the elongate members;
 (k) said pivotal mounting axes being spaced circumferentially of the path of the elongate members to position the sensor mounting means at positions spaced circumferentially of the elongate members;
 (l) said means forming said pivotal mounting axes being constructed and arranged to position said sensor mounting means at longitudinally spaced intervals relative to the elongate members so that the sensor means carried by said sensor mounting means overlap circumferentially without interfering with one another;
 (m) resilient means connected to one of said bases and extending toward the other of said bases and connected to the other end of each of said arms for urging the one end of each of said arms toward the elongate members to maintain the sensor mounting means carried on each arm adjacent the elongate members; and
 (n) said sensor mounting means providing inspection about the elongate members as flaws pass relative to the sensor mounting means.
2. The invention of claim 1 including means carried by one of said bases and connected to each of said arms and operable to move the arm so that the sensor mounting means carried by each of said arms is disengaged from adjacent the elongate members.

References Cited by the Examiner
UNITED STATES PATENTS

| | | | |
|---|---|---|---|
| 2,685,672 | 8/1954 | Price et al. | 324—37 |
| 2,878,447 | 3/1959 | Price et al. | 324—37 |
| 2,881,386 | 4/1959 | Price et al. | 324—37 |
| 2,980,850 | 4/1961 | Cochran | 324—37 |
| 3,029,382 | 5/1962 | Cochran et al. | 324—37 |

WALTER L. CARLSON, *Primary Examiner.*

RICHARD B. WILKINSON, *Examiner.*

R. J. CORCORAN, *Assistant Examiner.*